May 23, 1950  R. W. THOMAS ET AL  2,508,437
INSERTED BLADE CUTTER
Filed Dec. 21, 1945

INVENTORS
ROBERT W. THOMAS
LEWIS SKEEL

ATTORNEY

Patented May 23, 1950

2,508,437

UNITED STATES PATENT OFFICE 2,508,437

INSERTED BLADE CUTTER

Robert W. Thomas and Lewis Skeel, Meadville, Pa.; said Skeel assignor to said Thomas Application December 21, 1945, Serial No. 636,342

3 Claims. (Cl. 29—105)

This invention relates to devices for releasably locking cutting blades or tools in operating position in a tool head or body. More particularly, the present invention contemplates an improved locking and adjusting means for insertible blades or tools of milling cutters, reamers, boring bars, lathes, shapers, and the like.

In the pending application of Lewis Skeel (co-inventor here) Serial No. 607,946, filed July 31, 1945, and now abandoned, there is disclosed a locking device comprising a wedge element so related to a removable cutter blade and other adjacent structure that it must be moved inwardly or toward the base of the blade to clamp the latter in position. The arrangement there disclosed is very satisfactory for all purposes to which it is adapted. However, in some types of tools it may be desirable to force the wedge element outwardly so as to clamp the blade in a zone close to its cutting edge.

Moreover, the earlier Skeel device, above mentioned, preferably comprises a wedge carrier and an associated threaded operating member interconnecting the carrier and the wedge so that with its inward wedge movement it is not too well adapted for use in a tool embodying a head or body wherein only a relatively shallow recess is permissible for reception of the locking device. For example, in the smaller sizes of standard cutter heads and in many special cutter heads, an extremely narrow blade and shallow blade slot have to be used to prevent the slot from breaking through into the arbor hole; and for this same reason the recess for the locking device must be shallow. Similar conditions have to be met in a cutter where the head or body is solid and so small in diameter as to make it impossible to use a deep recess without unduly weakening the body against torsional and other stresses.

Accordingly, it is the primary object of the present invention to provide a locking device of the general character set forth above embodying a wedge element that is movable outwardly and toward the blade or tool to lock it in position.

Another major object resides in the provision of such a device and its arrangement whereby the wedge element, when tightened, engages the blade or tool adjacent its cutting edge.

The foregoing and further important objects will clearly appear from a study of the following detailed description of the accompanying drawing, wherein.

Figure 1:
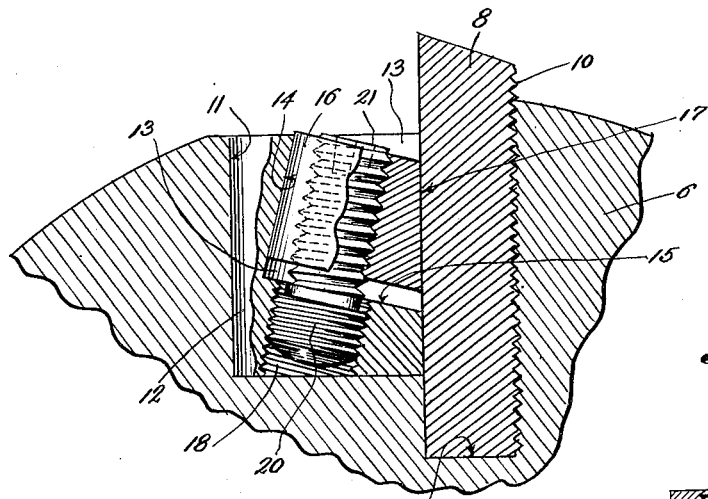
Figure 1 is a transverse section through a portion of a tool body showing an insertible blade in association with the securing device of this invention, in locked position.
Figure 3:
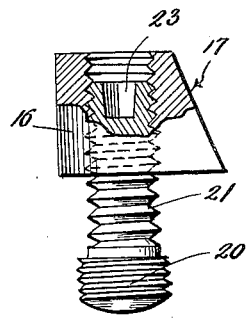
Figure 3 is an elevational view, in partial section, showing the wedge element and its actuating member detached from the carrier.

With continued reference to the drawing, a tool body 6, such as the head of a mill is slotted parallel or at an angle to its axis of rotation, as as 7, to receive a conventional cutting blade 8. In some machines or tools there may be only a single slot, with single blade, but in the common type of milling cutter there may be a circumferential series of slots and blades. The rear faces of the blades may be serrated at 10 for complemental coaction with serrated rear faces of the slots, as shown, for facilitation of adjustment and retention of the blades in fixed positions.

Figure 2:
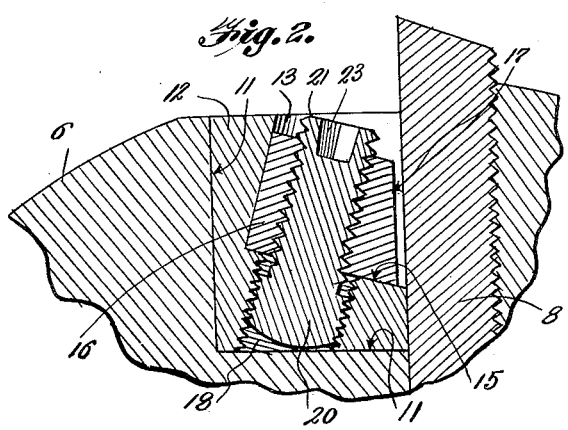
Figure 2 is a view similar to Figure 1 but showing the device adjusted to free or non-locking position.
Figure 4:
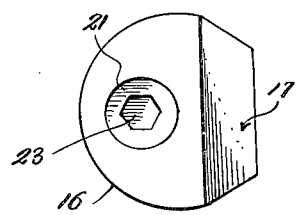
Figure 4 is a top plan view of the unit seen in Figure 3.
Figure 5:
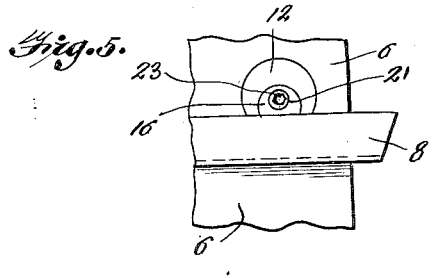
Figure 5 is a plan view, to reduced scale, as seen when looking downwardly upon the assembled parts of Figure 1.

Opening into the side of the slot 7 opposite the serrated face thereof is a cylindrically curved recess 11 the axis of which is parallel to the front face of the blade and located in a vertical plane in Figures 1 and 2. Within this recess there is slidably fitted a complementally shaped carrier 12 having a flat face contacting the front face of the blade, there being just sufficient clearance around the carrier to permit it to slide vertically into and out of the recess. The recess 11 is relatively shallow, its depth in the illustration being approximately one-half the width of the blade.

The carrier 12 has an outwardly opening socket 13 which opens laterally through the carrier's flat face into the slot 7 and which has its axis inclined upwardly and rearwardly toward the blade 8. The internal socket surface 14 preferably is cylindrically curved, and its bottom surface 15 may be flat. A wedge element 16, shorter than the socket, is fitted therein and is complementally shaped to slide axially in surface contact with the curved wall 14. The element 16 has a flat wedging surface 17 parallel to the blade 8 and so related thereto that when the element is about to emerge from the socket, as in Figure 1, the surface 17 is clamped securely against the blade; and when the bottom of the element reaches the flat surface 15 there is a substantial clearance (Figure 2) between the wedge element and the blade. When in the latter position, the carrier, the wedge and the wedge operating member (to be described) are readily removable as a unit, and, likewise, the blade is insertible and removable.

The means for actuating the wedge element comprises a differential screw established by utilizing different values of a helix. The screw preferably has sections of greater and less diameters. The screw section 20 of larger diameter is provided with a relatively fine thread working in complementary threads of a tapped opening 18 in the base of the carrier 12 and the screw section 21 of smaller diameter is provided with a relatively coarse thread of greater lead value working in complementary threads in the wedge element 16. The relatively coarse and fine threads are wound in the same direction and afford a differential action for moving the wedge when the screw is rotated. The axis of the screw is parallel with the wall or surface 14 of the socket and the exposed end of the screw is formed with a recess 23 for the reception of a turning tool or wrench.

Many of the functions and advantages of the locking assembly of the aforementioned earlier Skeel application obviously are inherent in the present construction and need not be discussed here. It should be emphasized, however, that in the assembly of this joint invention, the flat surface 17 of the wedge is closer to the outer edge of the cutting blade, and that the widest portion of this surface is at its outer end so as to present a zone of maximum area for clamping engagement with the blade adjacent its cutting edge. Also, that the recess 11 may be even further decreased in depth and that the wedge element 16 may project substantially beyond the outer end of the recess when tightened, thus to permit use of the present assembly in cutter heads of unusually small diameter where the recess must necessarily be very shallow.

What is claimed is:

1. The combination of a tool body having a blade slot, a blade in said slot, a unitary blade securing device mounted in said body adjacent one side of said blade and including a carrier having a socket in the outer portion thereof provided with a rear wall inclined outwardly toward the adjacent side of said blade, a wedge element slidably fitted in said socket in contact with said inclined wall, and a differential screw for moving the wedge element outwardly into clamping engagement with said blade, said screw having a relatively coarse thread rotatable within said wedge element and a relatively fine thread rotatable within said carrier.

2. The combination of a tool body provided with a blade slot and a recess communicating therewith, a blade in said slot, a blade securing device in said recess and including a carrier having a socket opening through the outer end of the carrier and into the blade slot and provided with a rear wall inclined toward the outer cutting edge of said blade, a wedge element fitted in said socket and having a surface slidably contacting said inclined wall and another surface complemental to the blade, and a rotatable actuating screw mounted in said carrier and threadedly connected to said wedge element for moving the latter outwardly into clamping engagement with said blade near the cutting edge thereof.

3. The combination of a tool body provided with a blade slot and a recess communicating therewith, a blade in said slot, a blade securing device in said recess and including a carrier having a socket opening through the outer end of the carrier and into the blade slot and provided with a rear wall inclined outwardly toward the outer cutting edge of said blade, a wedge element fitted in said socket and having a surface slidably contacting said inclined wall and another surface complemental to the blade, and an actuating screw threadedly connected to said carrier and said wedge element for moving the latter outwardly into clamping engagement with said blade, the threaded connection between said screw and said carrier being of a different lead than that between said wedge element and said screw.

ROBERT W. THOMAS.
LEWIS SKEEL.

REFERENCES CITED

The following references are of record in the file of this patent:

UNITED STATES PATENTS

| Number | Name | Date |
| --- | --- | --- |
| 895,219 | Whittemore et al. | Aug. 4, 1908 |
| 1,756,986 | Miller | May 6, 1930 |
| 2,245,446 | Sheldrick | June 10, 1941 |
| 2,309,657 | Miller | Feb. 2, 1943 |